(12) United States Patent
Healey et al.

(10) Patent No.: US 8,000,609 B2
(45) Date of Patent: Aug. 16, 2011

(54) COMMUNICATING OR REPRODUCING AN AUDIBLE SOUND

(75) Inventors: Peter Healey, Ipswich (GB); Edmund S R Sikora, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 496 days.

(21) Appl. No.: 11/918,434

(22) PCT Filed: Apr. 12, 2006

(86) PCT No.: PCT/GB2006/001325
§ 371 (c)(1),
(2), (4) Date: Oct. 12, 2007

(87) PCT Pub. No.: WO2006/109051
PCT Pub. Date: Oct. 19, 2006

(65) Prior Publication Data
US 2009/0103928 A1    Apr. 23, 2009

(30) Foreign Application Priority Data
Apr. 14, 2005 (EP) .................................. 05252307

(51) Int. Cl.
*H04B 10/00* (2006.01)
*H04B 10/12* (2006.01)

(52) U.S. Cl. ........................... 398/141; 398/16; 398/140
(58) Field of Classification Search .................. 398/140, 398/188, 16, 13, 20, 28, 33, 141; 356/477, 356/478; 250/227.19, 227.27; 385/12
See application file for complete search history.

(56) References Cited

U.S. PATENT DOCUMENTS

| 4,297,887 A | 11/1981 | Bucaro |
| 4,370,610 A | 1/1983 | Allen |
| 4,397,551 A | 8/1983 | Bage et al. |
| 4,443,700 A | 4/1984 | Macedo et al. |

(Continued)

FOREIGN PATENT DOCUMENTS

EP    0 251 632 A2    1/1988

(Continued)

OTHER PUBLICATIONS

U.S. Appl. No. 10/573,266, filed Mar. 23, 2006, Sikora et al.
U.S. Appl. No. 11/403,200, filed Apr. 13, 2006, Sikora et al.
U.S. Appl. No. 11/791,927, filed May 31, 2007, Sikora et al.
U.S. Appl. No. 11/791,923, filed May 31, 2007; Healey et al.
U.S. Appl. No. 11/663,954, filed Mar. 28, 2007, Sikora et al.

(Continued)

*Primary Examiner* — M. R. Sedighian
(74) *Attorney, Agent, or Firm* — Patterson Thuente Christensen Pedersen, P.A.

(57) ABSTRACT

The present invention relates to the communication or reproduction of sound, in particular audible sound. There is provided a method of communicating a sound, including the steps of: transmitting, onto an optical link, pairs of signal copies, the signal copies of a given pair having a time offset relative to one another; applying the audible sound to the optical link, such that the audible sound causes a phase modulation to the transmitted signal copies; receiving modulated signal copies previously transmitted onto the link; and, for received pairs of signal copies, causing one signal copy of a pair to mix with the other signal copy of that pair so as to produce a signal representative of the sound. The sound is an audible sound. It has been found that a delay of at least 75 micro seconds allows for a better reproduction of audio sounds, since these have a relatively low frequency content.

9 Claims, 3 Drawing Sheets

U.S. PATENT DOCUMENTS

| | | |
|---|---|---|
| 4,463,451 A | 7/1984 | Warmack et al. |
| 4,538,103 A | 8/1985 | Cappon |
| 4,572,949 A | 2/1986 | Bowers et al. |
| 4,593,385 A | 6/1986 | Chamuel |
| 4,649,529 A | 3/1987 | Avicola |
| 4,654,520 A | 3/1987 | Griffiths |
| 4,668,191 A | 5/1987 | Plischka |
| 4,688,200 A | 8/1987 | Poorman et al. |
| 4,697,926 A | 10/1987 | Youngquist et al. |
| 4,708,471 A | 11/1987 | Beckmann et al. |
| 4,708,480 A | 11/1987 | Sasayama et al. |
| 4,770,535 A | 9/1988 | Kim et al. |
| 4,781,056 A | 11/1988 | Noel et al. |
| 4,805,160 A | 2/1989 | Ishii et al. |
| 4,847,596 A | 7/1989 | Jacobson et al. |
| 4,885,462 A | 12/1989 | Dakin |
| 4,885,915 A | 12/1989 | Jakobsson |
| 4,897,543 A | 1/1990 | Kersey |
| 4,907,856 A | 3/1990 | Hickernell |
| 4,976,507 A | 12/1990 | Udd |
| 4,991,923 A | 2/1991 | Kino et al. |
| 4,994,668 A | 2/1991 | Lagakos et al. |
| 4,994,886 A | 2/1991 | Nadd |
| 5,004,912 A | 4/1991 | Martens et al. |
| 5,015,842 A | 5/1991 | Fradenburgh et al. |
| 5,025,423 A | 6/1991 | Earp |
| 5,046,848 A | 9/1991 | Udd |
| 5,051,965 A | 9/1991 | Poorman |
| 5,093,568 A | 3/1992 | Maycock |
| 5,104,391 A | 4/1992 | Ingle et al. |
| 5,140,559 A | 8/1992 | Fisher |
| 5,173,743 A | 12/1992 | Kim |
| 5,187,362 A | 2/1993 | Keeble |
| 5,191,614 A | 3/1993 | LeCong |
| 5,194,847 A | 3/1993 | Taylor et al. |
| 5,206,924 A | 4/1993 | Kersey |
| 5,223,967 A | 6/1993 | Udd |
| 5,307,410 A | 4/1994 | Bennett |
| 5,311,592 A | 5/1994 | Udd |
| 5,313,266 A | 5/1994 | Keolian et al. |
| 5,319,609 A | 6/1994 | Regnault |
| 5,351,318 A | 9/1994 | Howell et al. |
| 5,355,208 A | 10/1994 | Crawford et al. |
| 5,359,412 A | 10/1994 | Schulz |
| 5,361,130 A | 11/1994 | Kersey et al. |
| 5,363,463 A | 11/1994 | Kleinerman |
| 5,373,487 A | 12/1994 | Crawford et al. |
| 5,379,357 A | 1/1995 | Sentsui et al. |
| 5,384,635 A | 1/1995 | Cohen |
| 5,412,464 A | 5/1995 | Thomas et al. |
| 5,457,998 A | 10/1995 | Fujisaki et al. |
| 5,473,459 A | 12/1995 | Davis |
| 5,491,573 A | 2/1996 | Shipley |
| 5,497,233 A | 3/1996 | Meyer |
| 5,500,733 A | 3/1996 | Boisrobert et al. |
| 5,502,782 A | 3/1996 | Smith |
| 5,511,086 A | 4/1996 | Su |
| 5,592,282 A | 1/1997 | Hartog |
| 5,604,318 A | 2/1997 | Fasshauer |
| 5,636,021 A | 6/1997 | Udd |
| 5,637,865 A | 6/1997 | Bullat et al. |
| 5,663,927 A | 9/1997 | Olson et al. |
| 5,691,957 A | 11/1997 | Spiesberger |
| 5,694,114 A | 12/1997 | Udd |
| 5,754,293 A | 5/1998 | Farhadiroushan |
| 5,767,950 A | 6/1998 | Hawver et al. |
| 5,778,114 A | 7/1998 | Eslambolchi et al. |
| 5,936,719 A | 8/1999 | Johnson |
| 5,975,697 A | 11/1999 | Podoleanu |
| 5,982,791 A | 11/1999 | Sorin |
| 5,991,479 A | 11/1999 | Kleinerman |
| 6,072,921 A | 6/2000 | Frederick et al. |
| 6,075,628 A | 6/2000 | Fisher et al. |
| 6,115,520 A | 9/2000 | Laskowski et al. |
| 6,148,123 A | 11/2000 | Eslambolchi |
| 6,185,020 B1 | 2/2001 | Horiuchi et al. |
| 6,194,706 B1 | 2/2001 | Ressl |
| 6,195,162 B1 | 2/2001 | Varnham et al. |
| 6,269,198 B1 | 7/2001 | Hodgson et al. |
| 6,269,204 B1 | 7/2001 | Ishikawa |
| 6,285,806 B1 | 9/2001 | Kersey et al. |
| 6,315,463 B1 | 11/2001 | Kropp |
| 6,381,011 B1 | 4/2002 | Nickelsberg |
| 6,459,486 B1 * | 10/2002 | Udd et al. ............... 356/483 |
| 6,487,346 B2 | 11/2002 | Nothofer |
| 6,489,606 B1 | 12/2002 | Kersey et al. |
| 6,594,055 B2 | 7/2003 | Snawerdt |
| 6,625,083 B2 | 9/2003 | Vandenbroucke |
| 6,628,570 B2 | 9/2003 | Ruffa |
| 6,704,420 B1 | 3/2004 | Goedgebuer et al. |
| 6,788,417 B1 | 9/2004 | Zumberge et al. |
| 6,813,403 B2 | 11/2004 | Tennyson |
| 6,859,419 B1 | 2/2005 | Blackmon et al. |
| 6,943,872 B2 | 9/2005 | Endo et al. |
| 7,006,230 B2 | 2/2006 | Dorrer et al. |
| 7,110,677 B2 | 9/2006 | Reingand |
| 7,266,299 B1 | 9/2007 | Bock et al. |
| 7,397,568 B2 | 7/2008 | Bryce |
| 7,536,102 B1 | 5/2009 | Huffman et al. |
| 7,548,319 B2 | 6/2009 | Hartog |
| 7,656,535 B2 | 2/2010 | Healey et al. |
| 7,667,849 B2 | 2/2010 | Sikora et al. |
| 7,697,795 B2 | 4/2010 | Heatley et al. |
| 7,725,026 B2 | 5/2010 | Patel et al. |
| 7,755,971 B2 | 7/2010 | Heatley et al. |
| 7,796,896 B2 | 9/2010 | Sikora et al. |
| 7,817,279 B2 | 10/2010 | Healey |
| 7,848,645 B2 | 12/2010 | Healey et al. |
| 2001/0028766 A1 | 10/2001 | Hatami-Hanza |
| 2002/0196447 A1 | 12/2002 | Nakamura et al. |
| 2003/0103211 A1 | 6/2003 | Lange et al. |
| 2003/0117893 A1 | 6/2003 | Bary |
| 2003/0174924 A1 | 9/2003 | Tennyson |
| 2004/0027560 A1 | 2/2004 | Fredin et al. |
| 2004/0113056 A1 | 6/2004 | Everall et al. |
| 2004/0201476 A1 | 10/2004 | Howard |
| 2004/0208523 A1 | 10/2004 | Carrick et al. |
| 2006/0163457 A1 | 7/2006 | Katsifolis et al. |
| 2006/0256344 A1 | 11/2006 | Sikora et al. |
| 2007/0009600 A1 | 1/2007 | Edgren et al. |
| 2007/0065150 A1 | 3/2007 | Sikora et al. |
| 2007/0127933 A1 | 6/2007 | Hoshida et al. |
| 2007/0264012 A1 | 11/2007 | Healey et al. |
| 2008/0013161 A1 | 1/2008 | Tokura et al. |
| 2008/0018908 A1 | 1/2008 | Healey et al. |
| 2008/0123085 A1 | 5/2008 | Sikora et al. |
| 2008/0166120 A1 | 7/2008 | Heatley et al. |
| 2008/0219093 A1 | 9/2008 | Heatley et al. |
| 2008/0219660 A1 | 9/2008 | Healey et al. |
| 2008/0232242 A1 | 9/2008 | Healey |
| 2008/0278711 A1 | 11/2008 | Sikora et al. |
| 2009/0014634 A1 | 1/2009 | Sikora et al. |
| 2009/0097844 A1 | 4/2009 | Healey |
| 2009/0135428 A1 | 5/2009 | Healey |
| 2009/0252491 A1 | 10/2009 | Healey |
| 2009/0274456 A1 | 11/2009 | Healey et al. |

FOREIGN PATENT DOCUMENTS

| | | |
|---|---|---|
| EP | 0 360 449 A2 | 3/1990 |
| EP | 0364093 | 4/1990 |
| EP | 0 376 449 A1 | 7/1990 |
| EP | 0 377 549 | 7/1990 |
| EP | 0513381 | 11/1992 |
| EP | 0 592 690 A1 | 4/1994 |
| EP | 0 794 414 A2 | 9/1997 |
| EP | 0 821 224 A2 | 1/1998 |
| EP | 0 953 830 A2 | 11/1999 |
| EP | 1 037 410 A2 | 9/2000 |
| EP | 1 096 273 A2 | 5/2001 |
| EP | 1236985 | 9/2002 |
| EP | 1 385 022 A1 | 1/2004 |
| EP | 1 496 723 | 1/2005 |
| EP | 1 496 723 A1 | 1/2005 |
| FR | 2 751 746 | 1/1998 |
| GB | 2 015 844 A | 9/1979 |
| GB | 2 019 561 A | 10/1979 |
| GB | 2 113 417 A | 8/1983 |

| | | |
|---|---|---|
| GB | 2 126 820 A | 3/1984 |
| GB | 2 205 174 A | 11/1988 |
| GB | 2 219 166 A | 11/1989 |
| GB | 2 262 803 A | 6/1993 |
| GB | 2 264 018 A | 8/1993 |
| GB | 2 401 738 A | 11/2004 |
| JP | 4115205 | 4/1992 |
| JP | 2001-194109 | 7/2001 |
| WO | WO 93/25866 A1 | 12/1993 |
| WO | WO 97/05713 A1 | 2/1997 |
| WO | 01/67806 | 9/2001 |
| WO | WO 01/67806 A1 | 9/2001 |
| WO | WO 02/065425 A1 | 8/2002 |
| WO | WO 03/014674 A2 | 2/2003 |
| WO | WO 2005/008443 A2 | 1/2005 |
| WO | WO2005/095917 | 10/2005 |

OTHER PUBLICATIONS

U.S. Appl. No. 11/663,957, filed Mar. 28, 2007, Healey et al.
U.S. Appl. No. 11/885,275, filed Aug. 29, 2007, Heatley et al.
U.S. Appl. No. 11/885,400, filed Aug. 27, 2007, Heatley et al.
U.S. Appl. No. 11/916,054, filed Nov. 30, 2007, Sikora et al.
U.S. Appl. No. 11/887,382, filed Sep. 28, 2007, Healey et al.
U.S. Appl. No. 12/295,784, filed Oct. 2, 2008, Healey et al.
U.S. Appl. No. 12/280,051, filed Aug. 20, 2008, Healey.
U.S. Appl. No. 12/280,047, filed Aug. 20, 2008, Healey.
U.S. Appl. No. 12/280,038, filed Aug. 20, 2008, Healey.
Office Action dated Sep. 19, 2008 in U.S. Appl. No. 10/573,266.
Office Action dated Mar. 17, 2009 in U.S. Appl. No. 10/573,266.
Office Action dated Jan. 23, 2009 in U.S. Appl. No. 11/403,200.
Office Action dated Jun. 6, 2008 in U.S. Appl. No. 11/403,200.
Office Action dated Aug. 23, 2007 in U.S. Appl. No. 11/403,200.
Office Action dated Mar. 25, 2009 in U.S. Appl. No. 11/885,275.
Office Action dated Jul. 7, 2009 in U.S. Appl. No. 11/885,400.
Office Action Jan. 14, 2009 in U.S. Appl. No. 11/885,400.
Office Action dated May 14, 2009 in U.S. Appl. No. 11/916,054.
Office Action dated Jul. 8, 2009 in U.S. Appl. No. 11/791,927.
Office Action dated Sep. 5, 2008 in U.S. Appl. No. 11/791,923.
Office Action dated Feb. 26, 2009 in U.S. Appl. No. 11/791,923.
International Search Report dated Nov. 22, 2005.
International Search Report for PCT/GB2005/003680 mailed Dec. 1, 2005.
International Search Report for PCT/GB2005/003594 dated Dec. 16, 2005.
International Search Report mailed Jan. 14, 2005 in International Application No. PCT/GB2004/004169.
International Search Report mailed May 8, 2006 in PCT/GB2006/000750.
International Search Report mailed May 29, 2006 in PCT/GB2006/000759.
International Search Report mailed Jun. 30, 2006, dated Jun. 7, 2006, in PCT/GB2006/001173.
International Search Report mailed Jul. 17, 2007 in PCT/GB2007/001188.
International Search Report mailed Jul. 27, 2006 in PCT/GB2006/001993.
International Search Report mailed Apr. 13, 2007 in PCT/GB2007/000360.
International Search Report mailed Apr. 18, 2007 in PCT/GB2007/000343.
International Search Report mailed May 2, 2007 in PCT/GB2007/000359.
International Search Report dated May 16, 2006 in PCT/GB2005/004850.
International Search Report dated Mar. 15, 2006, mailed Mar. 24, 2006 in PCT/GB2005/004873.
International Search Report for PCT/GB2005/003594 mailed Dec. 16, 2005.
UK Search Report dated May 24, 2005 in GB506591.7.
UK Search Report dated Dec. 4, 2003 in GB Application No. GB 0322859.0.
Gupta et al., "Capacity Bounding of Coherence Multiplexed Local Area Networks Due to Interferometric Noise," IEE Proc.-Optoelectron., vol. 144, No. 2, pp. 69-74, Apr. 1997.
Liang et al., "Modified White-Light Mach Zehnder Interferometer for Direct Group-Delay Measurements," Applied Optics, vol. 37, Issue 19, Abstract, Jul. 1998.
Jang et al., "Noncontact Detection of Ultrasonic Waves Using Fiber Optic Sagnac Interferometer," IEEE Transactions on Ultrasonics, Ferroelectrics, and Frequency Control, vol. 49, No. 6, Jun. 2002, pp. 767-775.
Yilmaz M. et al., "Broadband vibrating quartz pressure sensors for tsunameter and other oceanographic applications," Oceans '04, MTTS/IEEE Techno-Ocean '04, Kobe, Japan, Nov. 9-12, 2004, Piscataway, NJ, USA, IEEE, Nov. 9, 2004, pp. 1381-1387, XP010776555; Internet version, Oceans 2004, Kobe, Japan, pp. 1-7, Redmond, WA USA.
Szustakowski et al., Recent Development of Fiber Optic Sensors for Perimeter Security, Military University of Technology, IEEE 2001, pp. 142-148.
"Fading Rates in Coherent OTDR," Electronics Letters, vol. 20, No. 11, May 24, 1984.
PCT International Search Report mailed May 24, 2006.
Application and File History of U.S. Appl. No. 12/280,038, Inventor: Healey, filed Aug. 20, 2008.
Application and File History of U.S. Appl. No. 11/663,954, Inventor: Sikora, filed Mar. 28, 2007.
Application and File History of U.S. Appl. No. 11/791,927, Inventor: Sikora, filed May 31, 2007.
Application and File History of U.S. Appl. No. 11/887,382, Inventor: Healey, filed Sep. 28, 2007.
Application and File History of U.S. Appl. No. 12/295,784, Inventor: Healey, filed Oct. 2, 2008.
Application and File History of U.S. Appl. No. 10/594,433, Inventor: Healey, filed Sep. 26, 2006.
Application and File History of U.S. Appl. No. 12/280,047, Inventor: Healey, filed Aug. 20, 2008.
Application and File History of U.S. Appl. No. 12/280,051, Inventor: Healey, filed Aug. 20, 2008.
Application and File History of U.S. Appl. No. 11/663,957, Inventor: Healey, filed Mar. 28, 2007.
Application and File History of U.S. Appl. No. 11/403,200, Inventor: Sikora, filed Apr. 13, 2006.
Application and File History of U.S. Appl. No. 10/573,266, Inventor: Sikora, filed Mar. 23, 2006.
Application and File History of U.S. Appl. No. 11/791,923, Inventor: Healey, filed May 31, 2007.
Application and File History of U.S. Appl. No. 11/885,275, Inventor: Healey, filed Aug. 29, 2007.
Application and File History of U.S. Appl. No. 11/885,400, Inventor: Healey, filed Aug. 30, 2007.
Application and File History of U.S. Appl. No. 11/916,054, Inventor: Sikora, filed Nov. 30, 2007.
State Intellectual Property Office of China, Rejection Decision, Application No. 200580009905.4, dated Dec. 4, 2009, 19 pages.
State Intellectual Property Office of China, Third Notification of Office Action, Application No. 200580009905.4 dated Jun. 19, 2009, 4 pages.
State Intellectual Property Office of China, Second Notification of Office Action, Application No. 200580009905.4 dated Mar. 27, 2009, 4 pages.
State Intellectual Property Office of China, Text of First Office Action, dated Aug. 15, 2008.
European Search Report, Application No. 05733029.2-1524, dated Apr. 6, 2010, 7 pages.
European Search Report, Application No. 05826466.4-2415, dated Jul. 27, 2010.
Japanese Office Action for Japanese Application No. 2007-505635 mailed Aug. 17, 2010.
Office Action from U.S. Appl. No. 12/295,784 mailed May 12, 2011.
Notice of Allowance from U.S. Appl. No. 12/280,047 mailed May 26, 2011.

* cited by examiner

Mag(R) given D & (T-τ)/D

Argument (given fo = 1.25kHz)

- □ 5fo
- ○ 3fo
- × fo

COMMUNICATING OR REPRODUCING AN AUDIBLE SOUND

This application is the U.S. national phase of International Application No. PCT/GB2006/001325 filed 12 Apr. 2006 which designated the U.S. and claims priority to GB 05252307.3 filed 14 Apr. 2005, the entire contents of each of which are hereby incorporated herein by reference.

The present invention relates to the communication or reproduction of sound, in particular audible sound.

Audible sound, that is, sound that is audible to the human ear (and also known as audio), is normally within the frequency range of 20 Hz to 20 kHz. Speech is normally accepted to be in the range 500 Hz to 5 kHz. However, in telephony networks arranged to carry speech, the frequency range within which speech signals are carried is typically 300 Hz to 3.4 kHz.

It is known from U.S. Pat. No. 6,459,486B1 to modulate information onto an optical link, where the modulation is achieved through a physical disturbance of the link. In this document, a system is disclosed in which signal copies are transmitted onto a link with a temporal offset to one another. However, no mention is made of using this system for communicating audible sound (although a microphone is mentioned with reference to other systems in the prior art). In fact, in U.S. Pat. No. 6,459,486B1, information signals to be communicated are superposed on a carrier wave before modulation onto an optical link. Furthermore, no mention is made of the extent of the delay between the signal copies.

According to the present invention, there is provided a method of communicating a sound, including the steps of: transmitting, onto an optical link, pairs of signal copies, the signal copies of a given pair having a time offset relative to one another; applying the audible sound to the optical link, such that the audible sound causes a phase modulation to the transmitted signal copies; receiving modulated signal copies previously transmitted onto the link; and, for received pairs of signal copies, causing one signal copy of a pair to mix with the other signal copy of that pair so as to produce a signal representative of the sound, characterised in that the sound is an audible sound and in that the temporal offset is greater than 75 micro seconds.

Because the temporal offset is greater than 75 micro seconds, audible sounds can be better communicated. This is due to a low-frequency roll-off that has been discovered in the frequency response of the sound-representative signal. In particular, it has been found that the frequency at which the roll-off occurs is dependent on the value of the temporal offset, and that by choosing the temporal offset to be greater than 75 micro seconds, audible sounds can be communicated well.

Furthermore, because the temporal offset is greater than 75 micro seconds, the resulting low frequency response will allow audible sounds to be communicated or carried in the audible bandwidth. In particular, a long delay will allow sounds to be modulated onto a waveguide in a modulation bandwidth that is within the bandwidth of the sounds themselves, without necessarily superposing the sound signal on a higher frequency carrier signal.

A 75 micro second delay (corresponding to 15 km of fibre) will cause a low frequency roll-off at around 1 kHz, which will be adequate for many types of audible signals. However, to better detect audio sounds having a low frequency content, such as speech, a delay of at least 100 micro seconds may be used (corresponding to 20 km of fibre), since this will have a lower roll-off, at around 800 Hz.

Even with a delay of only 75 micro seconds, speech may still be usefully received, in particular if the person speaking has a high-pitched voice. However other sounds such as noises or sounds from musical instruments may be picked up and reproduced, the sounds being reproduced sufficiently well for an operator listening to a reproduction of the sound to recognise the source of the sound.

Preferably, the audible sound will contain information, either digital or analogue, the information being within the audible bandwidth. The information may be contained in the amplitude of the sound as well as the frequency spectrum of the sound. In one embodiment the audio sound is a speech sound.

The audible sound will preferably be communicated from a first location at which the signal copies are modulated, to a second location where the signal copies are received, the two locations preferably being at least 1 km or 10 km apart, or sufficiently separated for sound from the first location to be inaudible directly, or at least difficult to hear directly at the second location. The signal copies will preferably be transmitted onto the optical link at the second location, for example such that the signal copies travel from the second location to the first location and back again along the same link, preferably along a common transmission medium of the link. In particular, the signal copies of a given pair travelling in a given direction or sense will preferably travel along a common transmission medium.

The optical link will preferably be an optical waveguide with a transmission medium arranged such that sound waves in the proximity of the waveguide can propagate into the transmission medium. The waveguide may include a protective region such as a sheath, coating or other layer, in which case the protective region will preferably be at least partly transmissive to sound waves. In a preferred embodiment, the waveguide is an optical fibre, or an optical fibre cable.

The sound waves may propagate through a fluid medium such as a gaseous medium, for example air, before reaching the waveguide. The fluid medium may act as a coupling medium though which sound waves are coupled to the waveguide. In one embodiment, the waveguide will be surrounded by or at least in contact with the fluid medium. Thus, the sound waves will preferably travel through the waveguide/fluid interface in order to be sensed by the waveguide.

The source of the sound waves will preferably be spaced apart from the waveguide, the fluid medium, extending (at least in part) between the waveguide and the source of the sound.

The signal copies will preferably be returned by a reflective interface, such as a mirrored end surface of the waveguide, although distributed backscattering such as Rayleigh scattering may be at least in part responsible for returning the signal copies.

The signals will preferably be provided by an optical source, preferably a source having a coherence time that is shorter by at least one order of magnitude than the temporal offset of the signal copies. The signal copies will then have irregular phase variations, which phase variations will preferably be common to each copy of a given pair. However, the copies may or may not be exact duplicates of one another. For example, the signal copies of a given pair may have different amplitudes or other characteristics.

The optical source will preferably be a continuous source, providing a wavetrain that is continuous at least on a time scale greater than the inverse of the lowest frequency of the sound-representative signal being received. In such a situation, the signals transmitted onto the link will only be conceptually distinct from one another, since in practice adjacent signals will be joined seamlessly. However, a pulsed source may be used instead of a continuous source.

Because of the temporal offset between the signal copies of a pair, there will be a leading copy and a trailing copy. The returned leading copy can then be delayed relative to the returned trailing copy, such that both copies can be mixed substantially in step with one another.

In a preferred embodiment, this is achieved using an interferometer stage, such as an un-balanced Mach Zehnder interferometer. In this preferred embodiment, the output from the optical source is fed to the interferometer stage, where the signal is copied, one copy being channeled to one path of the interferometer, the transit time associated with each path being different, such that a temporal offset results between the time at which the signal copies are transmitted from the interferometer stage. The same interferometer stage can then be employed to re-align the returned signal copies in a particularly convenient manner, since the relative delay imposed in the outbound direction will be the same as the relative delay imposed in the return direction, this being in each case determined by the difference in the transit times of the two paths. (A temporal offset of 75 micro seconds corresponds to a differential path length of about 15 km for single mode silica glass fibre at a transmission wavelength in the region of 1480 nm).

According to a further aspect of the invention, there is provided a microphone system for reproducing an audible sound, including: an optical link for sensing the audible sound; a transmission stage for transmitting, onto the optical link, pairs of signal copies such that the signal copies of a given pair have a time offset relative to one another, the optical link being arranged such that the sound causes the signal copies to suffer a phase modulation; and, a receiving stage for receiving modulated signal copies previously transmitted onto the link, the receiving stage being arranged, for received pairs, to cause one signal copy of a pair to mix inteferometrically with the other signal copy of that pair so as to reproduce the audible sound in the form of a sound signal, wherein the temporal offset is greater than 75 micro seconds.

Preferably, the transmission stage and the receiving stage are formed in common by an interferometer stage. The sound signal may be an optical signal from the interferometer stage. However, the optical signal may be converted to an electrical signal, or an acoustic signal, if for example if the microphone system includes a loudspeaker means.

The invention will now be described, by way of example only, with reference to the following drawings in which.

Figure 1:
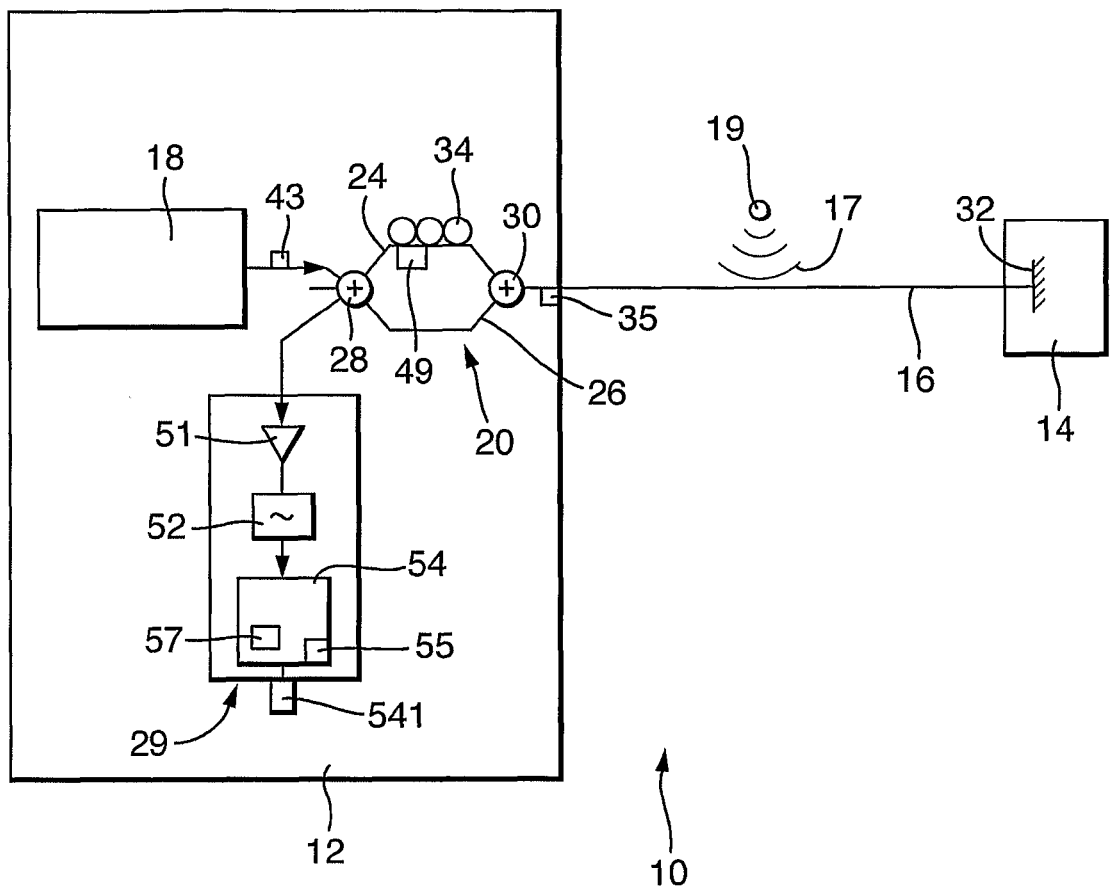
FIG. 1 shows a communication system with an interferometer connected to sensing cable, according to the present invention.

FIG. 1 shows a communications system 10, in particular a microphone system, in which a monitoring station 12 is connected to an optical link 16, here an optical fibre cable, which acts as an audio sensor. At least a sensing portion of the fibre cable 16 is exposed to sound waves 17 from a sound source 19, the sound waves in this example being provided by a person speaking (although the fibre cable is shown extending along a straight line, the cable path may include one or more coil portions, each wound on a mandrill for increasing the surface area of the cable exposed to the sound waves). The person speaking is displaced from the cable such that the sound waves propagate through the air before impinging on the cable surface. However, the person will be sufficiently close to the cable, for example at least 1 meter or at least 10 meters from the nearest point of the cable path, so that the sound waves cause a phase modulation light travelling along the cable. The phase modulation can then be detected at the monitoring station in order to retrieve the speech information.

In more detail, the monitoring station 12 includes an optical source 18 with a short coherence time (random phase changes in the output providing an irregular component to the signal). Sensing signals (waveform portions) from the optical source 18 are fed to an interferometer stage 20, here a Mach Zehnder interferometer having a first path 24 and a second path 26. The interferometer 20 includes a first coupling stage 28 for coupling optical radiation between the optical source 18, the first and second paths 24, 26, and a signal processing system 29. For light travelling in a forward direction, that is, away from the source, the first coupling stage 28 acts as a directional power (intensity) splitter, channeling light from the optical source 18 to each of the paths 24, 26, the power to each path being shared in a predetermined manner, here in a 50:50 ratio.

For each signal provided by the optical source 18 in a given time interval, that signal is copied such that there is a first copy and a second copy, the first and second copies being duplicates of one another. One copy travels along the first path 24 whilst the other copy travels along the second path 26. A second coupling stage 30 is provided for coupling light between the first and second paths 24, 26 and an output 35 of the interferometer, which output is connected to the optical link 16. For light travelling in the forward direction, the coupling stage 30 acts as a combiner, combining the light from the first and second paths and channeling this combined light to the interferometer output 35. The first path of the interferometer has a delay stage 34 for increasing the transit time of light travelling therealong between the first and second coupling stages 28,30, such that the transit time for light travelling between the coupling stages 28,30 is longer along the first path 24 than it is along the second path 26. Here, the delay stage is a portion of fibre, arranged as a coil. For each signal produced by the optical source, the interferometer 20 serves to create a pair of signal copies, and to delay one of the signal copies relative to the other signal copy, the signal copies of a pair being transmitted onto the link 16 at different times to one another.

The additional (differential) delay imposed by the delay stage 34 is much greater than the coherence time of the optical source 18. Thus, when light travelling along the first and second paths is recombined by the second coupling stage 30, the interference between light travelling along the two paths averages out, such that on average (over a timescale much greater than the coherence time) the amplitude of light upon recombination at the second coupling stage 30 is of constant amplitude 18.

Reflector means, such as a reflecting end surface 32 are provided at an end of the fibre cable (shown here located at an outstation 14) for returning signals to the base station 12. For signals travelling in the return direction, the second coupling stage 30 acts as a power splitter, in a similar fashion to the action of the first coupling stage 28 on light in the forward direction from the optical source 18. In this way, return signals are copied at the second coupling stage 30, one copy being channeled along the first path 24, whilst the other copy is channeled along the second path 26. The first coupling stage 28 then serves to combine light from the first and second paths in the return direction, channeling the interference signal (resulting from the combined light) to a signal processing system 29.

The signal processing system 29 includes: a photo-receiver 51 coupled to the first coupling stage 28 for converting the optical interference signal into a corresponding signal in the electrical domain; a filter 52 for receiving the interference signal from the photo-receiver 51 and filtering the signal; and, an audio amplifier for amplifying the filtered interference signal. Optionally, an output from the amplifier will be connected to a loudspeaker means. Since the amplitude of the interference signal will vary in accordance with the amplitude of the applied acoustic signal, the interference signal will be a representation of the speech acoustically introduced onto the optical cable, which speech will be reproduced by the loudspeaker means.

The light source may be a Light Emitting Diode, a Fabry-Perot Laser Diode, or a source of amplified spontaneous emission such as an Erbium-Doped Fibre Amplifier or a Semiconductor Optical Amplifier, but preferably the light source will be a Super Luminescent Diode, since this has a broad and smooth power spectrum, and a short coherence time of about 0.5 pico seconds. The radiation produced by the optical source will preferably be unpolarised, or alternatively a de-polarising unit 43 may be provided between the light source and the interferometer, for depolarising the light before the light is injected into the interferometer (the depolarising unit may be for example, a Fibre Lyot de-polariser). A depolariser 49 will preferably be provided in one of the paths of the interferometer, here, the first path, so that the polarisation of light from the first path combining in the return direction at the first coupler 28 is at least partially aligned with that of the light from the other path. Typically, the source will operate at a wavelength of between 1 micron and 2 microns, preferably around 1.31, 1.48 or 1.55 microns, in order to efficiently make use of standard telecommunications optical fibre, such fibre being configured to support single mode transmission at this wavelength. Typically, the fibre will have a single core of a diameter which is around 9 or 10 microns.

The operation of the monitoring station 12 can be understood by conceptually dividing the continuous output from the optical source 18 into consecutive signals. For each signal generated by the source 18, there are four duplicates of this signal: a non-retarded signal S0 which has traveled along the second path 26 of the interferometer 20 in both the forward and reverse directions; a first retarded signal S1 delayed by a delay D in the forward direction (but not the reverse direction); a second retarded signal S2 retarded by the delay D in the reverse direction (but not the forward direction); and, a twice-retarded signal S3 retarded by a delay 2D, signal S3 being retarded in each of the forward and reverse directions.

The first and second retarded signals S1, S2 which are retarded in one direction only will return to the first coupler stage 28 at the same time. In the absence of any disturbance in the fibre cable 16, these signals are copies of one another and the signals will interfere or otherwise combine constructively at the first coupler stage 28. However, if at least one of the pair of signals S1, S2 is modulated or otherwise modified (relative to the other signal of the pair) by a disturbance along the fibre cable, the interference between the two signals will be different, resulting in a change in the interference signal. This change will be related to the amplitude and the spectral characteristics of the disturbance, allowing features of the disturbance to be retrieved at the monitoring station. (Clearly, some amplitude modulation of the signals may also result from the disturbance, which amplitude modulation will, to some extent, also be represented in the interference signal).

In particular, sound waves impinging on a glass fibre will cause a time-varying strain or other distortion of the glass structure of the fibre. This strain will change the refractive index in at least the core of the fibre, causing (at least partly as a result of the change in optical path length) a phase modulation in one or both of the signals of a pair travelling along the link. However, the interference signal will be the result of interference between, on the one hand, a signal having been modulated by the disturbance at one time, and on the other hand, a signal modulated by the disturbance at another time, the two times being separated by the differential delay D.

A simplified analysis would suggest that the delay time should be greater than the inverse of the lowest detectable frequency (so that the signal copies of a given pair experience a different phase change), which would make it difficult to conveniently detect low frequency sounds. For example, based on this simplified analysis, assuming travels a kilometre of fibre in 5 micro seconds, to detect a low-end frequency of 600 Hz would require a fibre delay of over 300 km. Due to losses in the fibre, such a long length would be undesirable. This is particularly so because for a given acceptable level of loss, the greater the length of the delay line, the shorter must be the length of the fibre extending between the monitoring station and the reflective end surface.

However a theoretical analysis has revealed that for a given delay time, the inherent non-linearity of the interferometer stage results in much lower frequencies being detectable than would be expected from the simple considerations outlined above.

Considering a discrete reflector (the mirrored end surface 32) and a continuous wave (cw) excitation signal, for a 'point' disturbance of the form $m(t) \approx \exp(-j\phi_m(t))$, it can be shown that the "ac" term at the output of the interferometer (i.e., the interference signal) under cw excitation is given by . . .

$$z_{ac}(t) \propto 2 \cdot \cos\left[\phi_m(t-\tau) + \phi_m(t-2T+\tau) - \phi_m(t-\tau-D) - \phi_m(t-2T+\tau-D)\right] \quad (1)$$

where, T is the time of flight of the reflection point from the start of the fibre under test (from the output of the interferometer, that is from the second coupling stage 30 and τ is the time of flight to the point of the disturbance (T does not include the delay). D is the unbalanced delay in the interferometer.

If we consider a sinusoidal modulating disturbance of the form $\phi_m(t) = a \cdot \sin(\omega_m t)$, then equation (1) becomes . . .

$$z_{ac}(t) \propto \cos\left[4 \cdot a \cdot \sin\left(\frac{\omega_m D}{2}\right) \cdot \cos\{\varpi_m(T-\tau)\} \cdot \cos\left\{\varpi_m\left(t - T - \frac{D}{2}\right)\right\}\right] \quad (2a)$$

which can be put in the form . . .

$$z_{ac}(t) \propto \cos[R_2 \cdot \sin(\overline{\omega}_m t - \Psi_2)] \quad (2b)$$

This is a classical result for angle modulation and can be evaluated using Bessel functions of the first kind. The angle modulation depth $R_2$ is a function of the amplitude a, position τ, and the frequency $\omega_m$, of the disturbance and given by $$R_2 = 4 \cdot a \cdot \operatorname{Sin}\left\{\frac{\omega_m D}{2}\right\} \cdot \operatorname{Cos}\{\varpi_m(T - \tau)\}. \quad (2c)$$

Here, D is the delay time between signal copies of a given pair. From (2c), it follows that the variation depth will undergo minima and maxima at the following points and frequencies $$\text{Min when } f_m = \frac{n}{D}, \frac{2n-1}{4(T-\tau)}; \text{ Max when } f_m = \frac{2n-1}{2D}, \frac{n}{2(T-\tau)}$$

where n is an integer in the range $[-\infty,\infty]$.

Figure 2A:
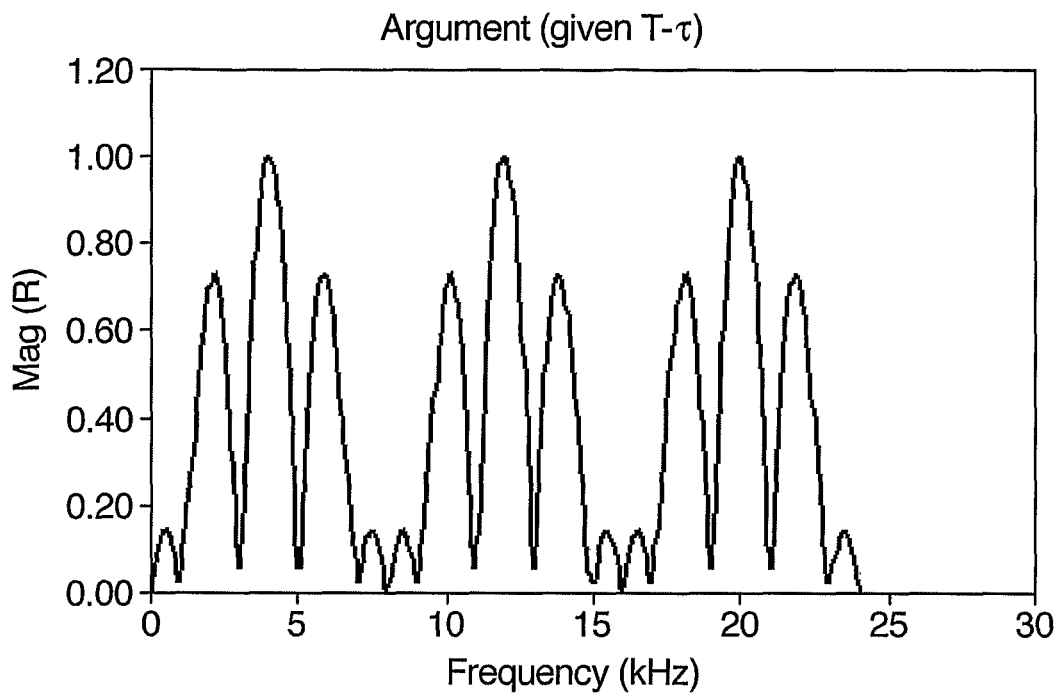
FIG. 2a shows the frequency response of the system when the source of the sound is far from the end of the sensing cable.
Figure 2B:
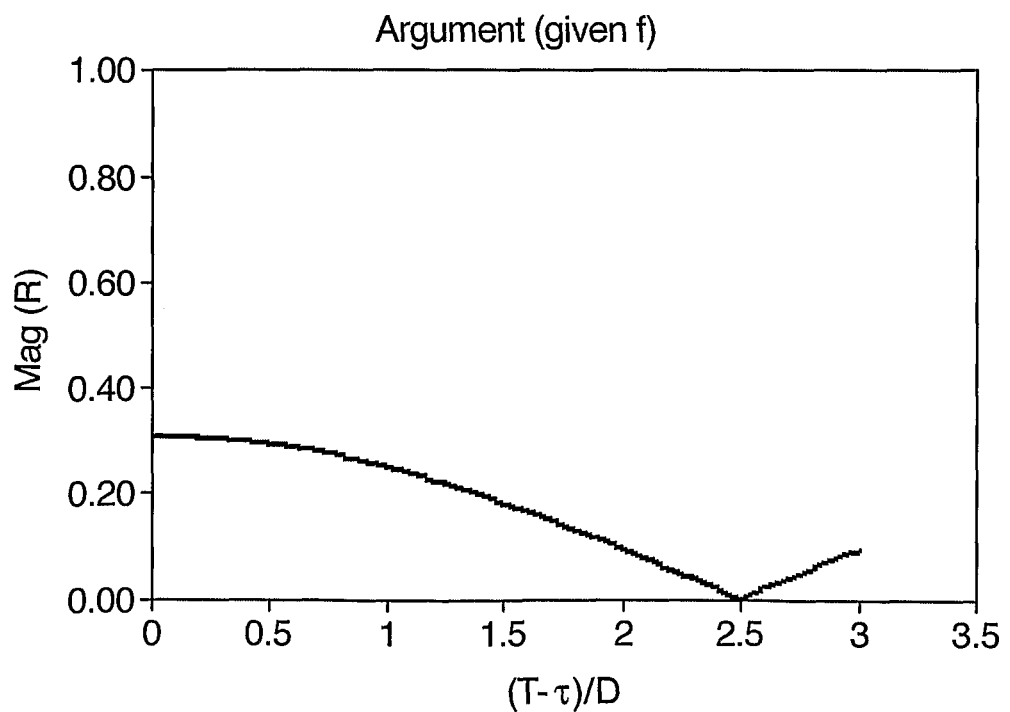
FIG. 2b shows the response of the system to an 800 Hz tone as a function of the position of the source of tone.

FIGS. 2a,2b show examples plots of equation (2c) for various values of modulating frequency, interferometer delay D, and relative disturbance location $(T-\tau)/D$. In FIG. 2a, 4a=1, D=125 micro seconds, (the time corresponding to a fibre delay length 25 km), $T-\tau=2D$. In FIG. 2b, D=125 micro seconds, and $f_m$=0.8 kHz. FIG. 2a essentially shows how the response of the sensor, that is, its sensitivity, changes as a function disturbance frequency, illustrating the effects of the non linear response of the fibre to disturbances.

It can be seen that the sensor response falls to zero at 8 kHz (corresponding to 1/D), but has a maximum at 4 kHz (corresponding to ½D). This illustrates how the delay length can be chosen in dependence one the frequencies that are to be detected. If the delay made longer, the frequency of maximum sensitivity will be shifted to lower frequency values. Generally, this will make the sensor more sensitive to lower-end frequencies. However, if the length is made too long, this will give rise to large losses. In addition, the minimum at 1/D will also shift to lower frequencies, and may begin to overlap with the frequency range that is to be detected. Typically, this problem may begin to become important for detecting sounds, in particular speech sounds, when the 1/D minimum reaches about 3 kHz, i.e, when the first minimum enters the normal telephony bandwidth. Thus, the delay length of fibre should preferably be less than about 70 km (corresponding to a delay of 350 micro seconds), or less than about 75 km. For example, a delay length of 55 km, the 6 dB point in the curve of FIG. 3 would occur at 3.4 kH, the edge of the telephony bandwidth.

However, it will still be possible to hear sounds with a delay line that is longer than 70 km, since the sensitivity will have further maxima. However, the reproduced sounds may be more distorted than with shorter delay lines, and the increased losses are likely to decrease the signal to noise ratio. In particular, if one of the minima is in an important part of the audio range that is to be detected, this could greatly affect the quality of the reproduced sound.

As is seen form FIG. 2a, the delay produces what is known as a comb-filter, the diagram above shows just the first tooth of the comb—which repeats every 8 kHz in this case. The actual response, when the fibre under test is long, is very complicated as it also depends on the position along the fibre where the sound is coupled in.

Figure 3:
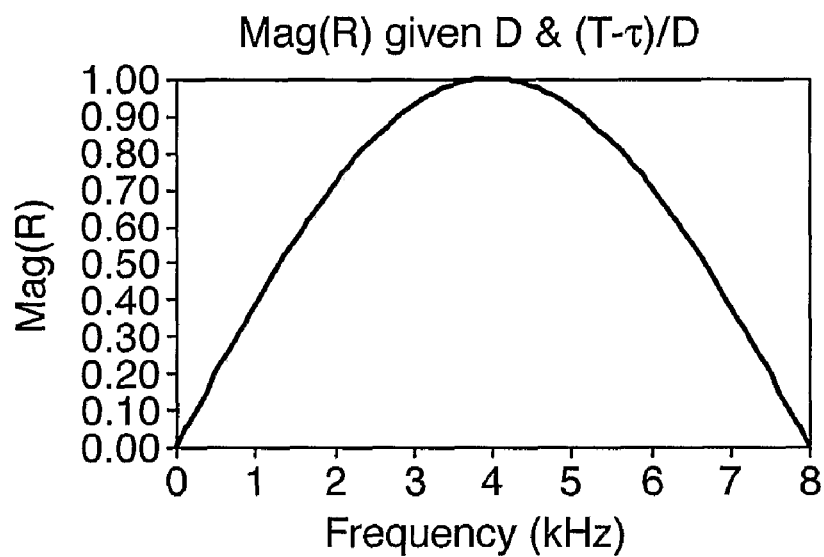
FIG. 3 shows the frequency response of the system when the source of the sound is close to the end of the sensing cable, in particular when the sensing cable is short.

Theoretically, the worst case (highest low-frequency cut-off) frequency occurs for those signals induced in a very short test fibre as shown in the FIG. 3. The functional form of the above curve of FIG. 3 is simply $\operatorname{Abs}\{\sin(\pi.f.L.5.10^{-6})\}$ where f is the frequency in (Hz) and L is the delay fibre length in (km). So, if we define the lower roll-off or cut-off frequency, as the point where the response is 6 dB down (i.e., 0.25) of the maximum amplitude, then this occurs at approximately 640 Hz for a 25 km delay fibre. In general, using the 6 dB definition, the minimum delay fibre length becomes:

$$L(\min)\approx[\operatorname{Arcsin}(0.25)]/(5.10^{-6} \cdot \pi \cdot f)(\text{km})$$

where f is the desired roll-off frequency in Hz. In the case of a fibre delay length of 20 km (D=100 micro seconds), the roll-off occurs at 800 Hz, which will still provide good audio reproduction.

An important parameter is the path length between the position at which sound is introduced to the fibre and the end of the fibre or the point at which light is returned to monitoring station, this being $(T-\tau)$ in the equations above. In FIG. 2a, the structure between 0 and 8 kHz minima is due to the position of the sound disturbance (relative to the end of the fibre). The position of the sound disturbance is fixed in FIG. 2a: a differently position disturbance would give rise to a different comb structure in the interferometer response. In the case of a short fibre, or where $(T-\tau)$ is small, the structure will vary slowly with frequency. In particular, when D is greater or equal to 4 $(T-\tau)$, there will be no minima before f=1/D according to equation 2c. Such a situation is shown in FIG. 3 where there are no minima in the frequency range of interest, at least not below 8 kHz, there being only a broad maximum at 4 kHz (in FIG. 3, the delay length is 25 km, or equivalently 125 micro seconds, and only a short length of sensing fibre is used, and, further, it is assumed that that the modulation depth is small, as may be the case with some audible disturbances, in particular if the source is far from the fibre cable).

Figure 4:
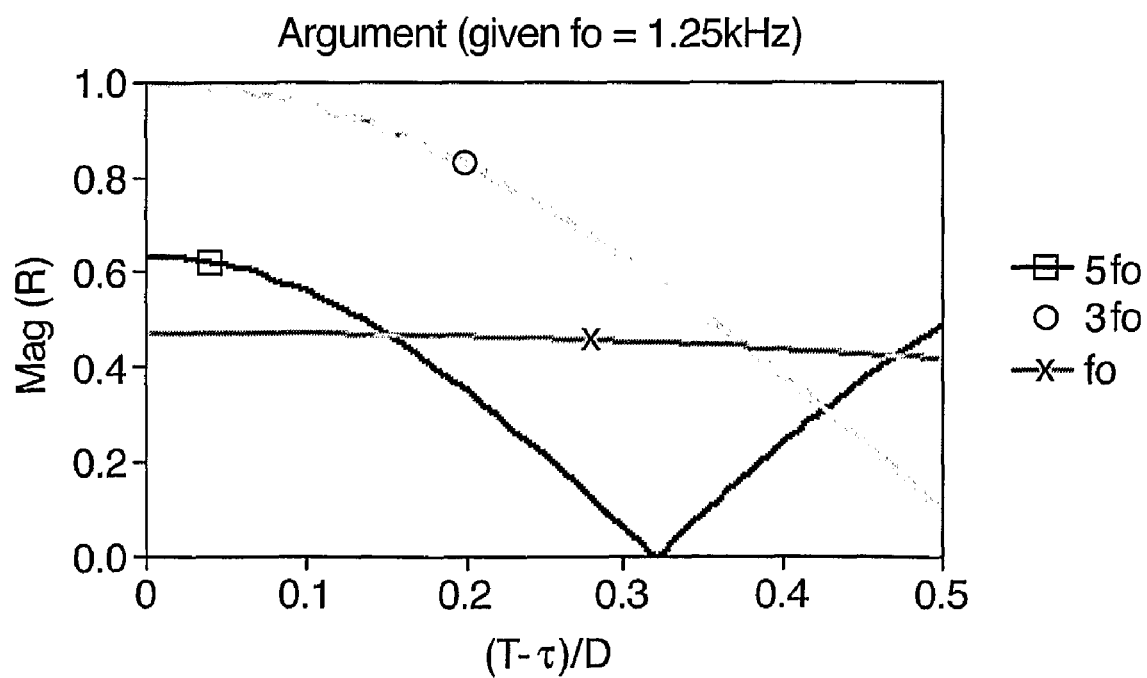
FIG. 4 shows the response of the system to an 1.25 kHz tone at different harmonics of the tone (3fo,5fo where fo is the fundamental tone frequency) as a function of the position of the source of tone; and, FIG. 5 shows a transfer function for the interferometer of FIG. 1.

In FIG. 2b, it is shown how the distance along the fibre cable at which a sound is sensed will affect the response. Clearly, there is a (frequency dependent) minimum at a point along the cable (only one is shown). FIG. 4 shows how the response can change for different harmonics of a fundamental frequency fo. Alternatively the figure shows how relative amplitude of the different harmonics 3fo and 5fo in sound introduced onto the fibre will change in dependence on the point at which the sound is introduced. Clearly, spectral content of a given sound reproduced at the monitoring station will vary depending on where the sound is introduced. (Although most reflection will occur at the mirrored end surface of the fibre, there will be some back scattering along the fibre, which can be viewed as a distributed reflection).

Another consideration is that (at least for a long fibre, where T>>D) the change in response is initially small as the source of sound moves from the reflective end of the fibre. That is, at the end of the fibre, the responds of the fibre is spatially reasonably uniform, becoming less uniform as the distance from the fibre end increases.

Thus, there may be provided a non sensing portion at which sound is not sensed, and a sensing portion at which sound can be sensed, the sensing portion being located towards the end of the cable (or a reflector, if the reflector is not at the cable end). The sensing portion may be provided by the portion of fibre cable extending from the reflector, the length of the sensing portion corresponding to an associated time of flight (i.e., $(T-\tau)$) that is preferably less than 0.25D. As can be seen from FIG. 4, the response only changes little over this length scale. However, the time of flight of the sensing portion will preferably be less or equal to 0.1 D, as the change in response is even less in this interval. The non sensing portion will preferably not be exposed to sounds, for example by being shielded in a duct, or underground (although some sound may still reach the non-sensing portion). In contrast, the sensing portion may be a region which includes coupling means for coupling to sound, or a region of cable or fibre that is coiled, for example around a mandrill.

Figure 5:
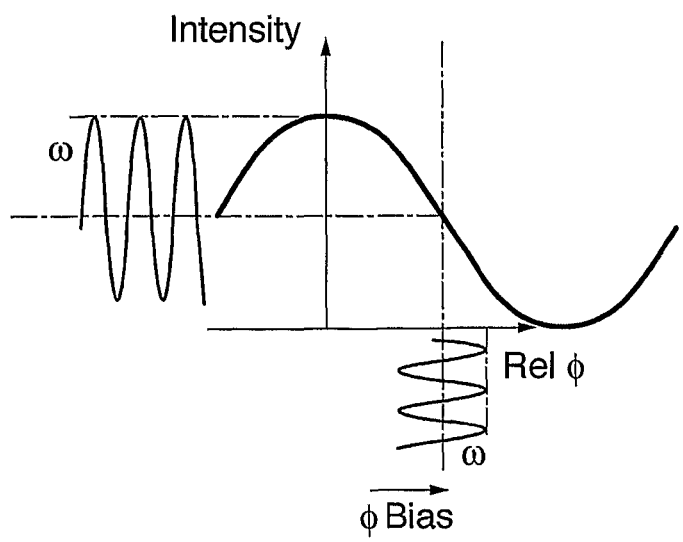

Many of considerations outlined above are at least in part due to non linear nature of the of the transfer function of the interferometer. As shown in FIG. 5, the transfer function is (co)sinusoidal, such that a tone disturbance at a single frequency in the relative phase of signal copies is likely to generate higher frequency components in the interferometer output. (There are also other sources of non linearity in the microphone system: for example, some non linearity is expected because a the increase in physical path length brought about by a given strain will be opposite to the change in optical path length due to the change in refractive index brought about by that strain).

Because of the cosine form of the transfer function, the amplitude of the output will depend on which part of the curve the input oscillation occurs. In particular, the amplitude of the output is dependent on the local slope, a maximum at a phase of 90 degrees, where the interferometer will be most sensitive. To achieve oscillations about the a point that is displaced from the origin, a phase bias or offset if needed. In the present system, a random or pseudo random or other varying phase bias is achieved by depolarising the light using a depolariser, for example located an arm of the interferometer. The fibre cable, (or at least a portion thereof such as the sensing portion or non sensing portion) is chosen that has a polarisation-dependent refractive index. With a material such as a birefringent material where the polarisation orientation of light affects the refractive index experienced by the light, the light of different polarisations will give rise to a different phase bias. As a result, the phase bias will be distributed, and is unlikely to always be zero. In addition to introducing a wavelength dependant phase bias (which means that at least part of the input to the 2×2 coupler (the first coupling stage), where coherent mixing occurs, is phase biased in order to enhance the sensitivity), the polariser de-polarises the broadband light from the source, and makes it likely that, on average, about 50% of the light on the two input arms of the coupler is in the same state of polarisation to facilitate efficient interferometric mixing. Although useful for detecting audible sounds, which are normally week and therefore benefit from a high sensitivity, the idea of using a depolariser in combination with a birefringent waveguide (preferably a non-polarisation maintaining birefringent waveguide) is not limited to applications where the delay between signal copies is greater than 75 micro seconds. In fact, this idea may be used to communicate or detect high frequency signals which are beyond the audio range.

However, if polarisation maintaining fibre is used in the fibre cable (as well as, preferably, in the interferometer), a steady phase bias can be achieved by using, at the first coupling stage 28, a 3×3 coupler (with some ports terminated), whereas the second coupling stage 30, at the transmission side, a 2×2 coupler can be used, with one port terminated. The 3×3 coupler will then create a relative phase bias of $\phi_b=120°$ between the optical fields on its output ports. This can be used to improve the sensitivity of the interferometer: if the phase modulation due to a disturbance is denoted as $\phi_d(t)$.), it can be shown that the receiver ac output signal is proportional to: $r_{ac}(t)=k\cdot\text{Cos}\{\phi_b+\phi_d(t)+\phi_m(t)\}$ where, k is a constant of proportionality and $\phi_m(t)$ is the data phase modulation signal. The equation shows how the phase bias can be used to select a higher slope region of the Cosine function in order to improve the sensitivity when the magnitude of the disturbance is small.

In summary, the phase modulation process is inherently non-linear, so a message bandwidth of say 300 Hz to 3400 Hz can give rise to a significantly larger modulation bandwidth—depending on the strength of the modulating signal. Sound signals, which often a weak signals, are much more linearly reproduced than strong ones. The interferometer transfer characteristic is also strongly dependant on the phase bias (which is itself a random variable).

Despite these complications, we still hear fairly good audio reproduction and can recognise speech and other sounds. Furthermore, it has been found that the comb filter of FIG. 2a will not prevent speech from being understood, although it may make it harder to recognise the person speaking. It is believe that the fact that this and other non linear features of the communications system do not prevent sounds being usefully received is at least in part due to the processing power of the human brain, and the fact that the modulation induced is weak not strong (as will normally be the case for modulation due to speech). It has been found that a delay of at least 75 micro seconds allows for a better reproduction of the audio sounds (which may be too quiet to be heard directly by the human ear), since these have a relatively low frequency content.

The invention claimed is:

1. A method of optically communicating an audible sound along an optical link, the method comprising:
  transmitting, onto the optical link, pairs of optical signal copies, the optical signal copies of a given pair having a time offset relative to one another of at least 75 microseconds;
  phase modulating the transmitted optical signal copies on the optical link, the phase modulation being caused by audible sound waves propagating through air to impinge on a sensing portion of the optical link;
  receiving reflected modulated optical signal copies previously transmitted onto the optical link; and,
  for received pairs of optical signal copies, causing one optical signal copy of a pair to mix with the other optical signal copy of that pair so as to produce a signal representative of a sensed audible sound.

2. A method as claimed in claim 1, wherein the offset is at least 100 micro seconds.

3. A method as claimed in claim 1, wherein the sound is a speech sound.

4. A method as claimed in claim 1, wherein the sound is communicated from a first sensing portion location at which the signal copies are modulated, to a second location where the signal copies are received, the two locations being at least 1 km to 10 km apart.

5. A method as claimed in 1, wherein the temporal offset is achieved using interferometer means.

6. A method as claimed in claim 5, wherein the signal copies of a pair a temporally re-aligned using the interferometer means.

7. A method as claimed in claim 1, further comprising:
  reproducing a sensed audible sound in the form of a sound signal from the representative signal.

8. A microphone system for reproducing an audible sound, comprising:
  an optical link for sensing the audible sound;
  a transmission stage for transmitting, onto the optical link, pairs of optical signal copies such that the signal copies of a given pair have a time offset relative to one another of at least about 75 microseconds; and, a receiving stage for receiving reflected optical signals of the optical signal copies previously transmitted onto the link, wherein:

the optical link is arranged such that audible sound waves propagating over air and impinging on a sensing portion of the optical link cause the optical signal copies to suffer a phase modulation; and the receiving stage is arranged, for received reflected pairs of optical signal copies, to cause one optical signal copy of a pair to mix with the other optical signal copy of that pair so as to enable reproduction of a sensed audible sound in the form of a sound signal.

9. A microphone system as claimed in claim 8, wherein the transmission stage and the receiving stage are formed in common by an interferometer stage.

\* \* \* \* \*